Feb. 18, 1969   J. L. CHANEY   3,428,392
ELASTOMERIC RING-LIKE MEMBERS FOR BIASING SPECTACLE TEMPLES
Filed Feb. 23, 1965
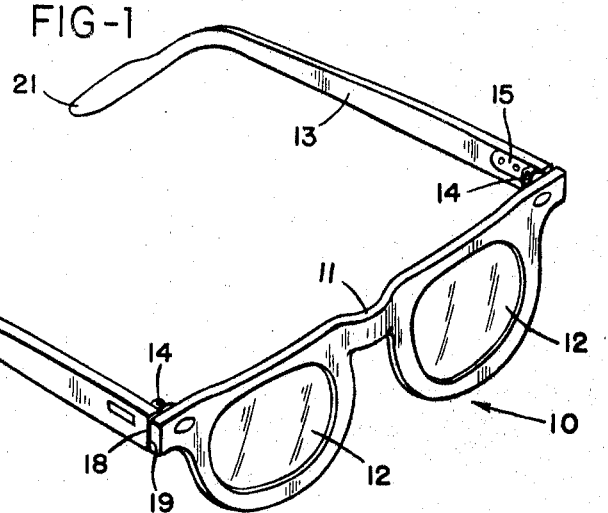
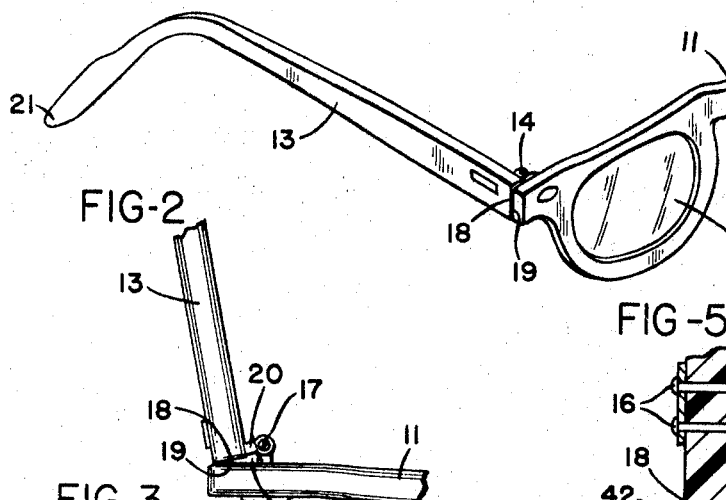
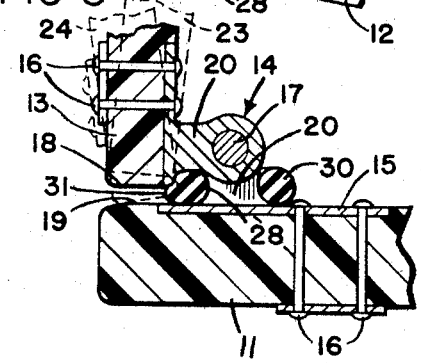
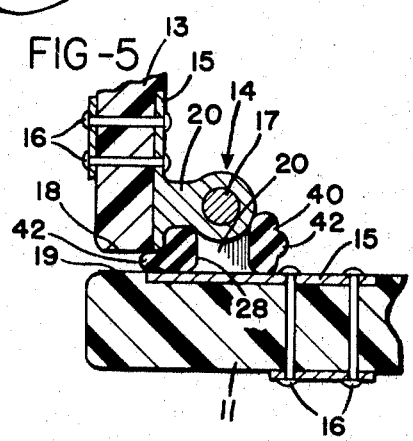
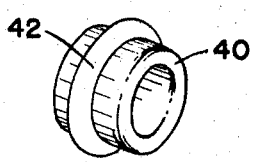
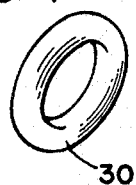
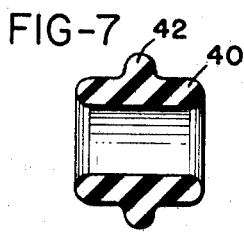
INVENTOR.
JOHN L. CHANEY
BY
Marechal, Biebel, French & Bugg
ATTORNEYS

United States Patent Office 3,428,392
Patented Feb. 18, 1969

3,428,392
ELASTOMERIC RING-LIKE MEMBERS FOR BIASING SPECTACLE TEMPLES
John L. Chaney, Lake Geneva, Wis. 53147
Filed Feb. 23, 1965, Ser. No. 434,282
U.S. Cl. 351—113                              1 Claim
Int. Cl. G02c 5/16

ABSTRACT OF THE DISCLOSURE

An elastomeric ring-like member, placed between a hinge post secured to one of the temple members of a pair of spectacles and the hinge plate secured to the frame member, has sufficient volume so that when the temple member is moved to its unfolded position, the hinge post will compress the elastomeric material against the hinge plate to bias the temples inwardly against the head of the wearer thus holding the spectacles securely in place.

---

This invention relates to an elastomeric member which is added to a pair of spectacles to aid in holding the spectacles tight against the head of the wearer.

As most wearers of spectacles are aware, after the spectacles have been worn for some time they begin to warp, become loose and tend to slip down the nose of the wearer, causing discomfort and annoyance. The slippage of the spectacles off the head of the wearer becomes especially noticeable when the face is wet with perspiration or when the wearer is occupied with some details of his work which may require that his head be lowered. The spectacles are usually held snugly in place by the side bars or temples of the spectacles which are held in position by their hinge connections with the frame member. The frame member is sufficiently resilient to allow the temple members to move further apart when putting on the spectacles or when taking them off. After the spectacles are used for a period of time the hinge connections have a tendency to become loose, and the resilience of the temple members will decrease so that pressure against the side of the head is reduced and the spectacles are no longer snugly held in place.

To compensate for the loss of resilience of the temples and frame and the looseness in the hinge connections and to thus reestablish the snug contact between the temple members and the head of the wearer, this invention provides a ring-like elastomeric member which is placed over the hinge connections and between the hinge post and hinge plate on a pair of spectacles as well as between the abutting surfaces of the temple members and frame. This elastomeric member occupies a certain amount of space between the hinge post, hinge plate and abutting surfaces to urge these surfaces apart and cause the temple members to be biased inwardly against the head to hold the temples tight against the head of the wearer.

Accordingly, it is an important object of this invention to provide an apparatus for use with a pair of spectacles which will compensate for looseness of the temples by adding additional resilience to the temple members to bias them inwardly against the head of the wearer.

Another object of this invention is to provide an elastomeric ring-like member which can be placed over the hinge connecting the frame of the spectacles to the temple members so that a portion of the elastomeric member will be placed between the hinge post and the hinge plate of the spectacles as well as between the abutting surfaces of each temple and the frame to compensate for age and warping of said spectacles but which will be hidden from view.

A further object of this invention is to provide a ring-like elastomeric member for retaining the hinge screw in place to prevent the possibility of its working loose and being lost.

An additional object of this invention is to provide an elastomeric ring-like member to use with a pair of spectacles which is easy to install and remove and which can fit all types of spectacles.

These and other objects and advantages of the invention will be apparent from the following description, the accompanying drawing and the appended claim.

In the drawing—

FIG. 1 is a perspective view of a pair of spectacles showing the elastomeric member of this invention positioned over the hinge member of said spectacles;

FIG. 2 is a plan view showing the relative position of a single temple member to the frame without the elastomeric member of this invention;

FIG. 3 is a sectional plan view of the spectacles including the elastomeric member of this invention which shows the range of movement of the temple with respect to the frame;

FIG. 4 is a perspective view of one form of the ring-like elastomeric member of this invention;

FIG. 5 is a sectional plan view of a conventional type of spectacles with another form of elastomeric member of this invention attached thereto;

FIG. 6 is a perspective view of another form of the elastomeric member of this invention; and FIG. 7 is a cross-sectional view of the elastomeric member shown in FIG. 6.

Referring now to the drawings wherein the preferred embodiments of the invention are shown, FIGS. 1 and 2 illustrate a pair of spectacles 10 including a pair of lenses 12 mounted in the frame 11. A pair of temples or side bars 13 are attached to the outer end of the frame by metallic hinges 14. These hinges consist of a pair of hinge plates 15, each plate secured to the frame and temple, respectively, by screws or rivets 16, and a hinge post 20 secured to each plate and having interlocking hinge portions which are pivotally secured to each other by a screw or hinge pin 17 so that relative movement between the temple and the frame is possible. The outward travel of the temples 13 is limited by the abutment of the end 18 of the temple and the abutment portion 19 of the frame 11.

As the temples 13 are forced outwardly by putting the spectacles on and off, either the frame will be bent outwardly, or the temples will be warped, or the abutting surfaces will become worn, with the result that the temple members are no longer biased inwardly and the spectacles will no longer fit as snugly as desired against the head of the wearer. The addition of the elastomeric member of this invention, between hinge post 20 and hinge plate 15 has the effect of restoring the temples to their original position, giving them new resiliency and aiding in holding the spectacles tight.

One form of ring-like elastomeric member constructed according to this invention which is useful in biasing the temple members inwardly against the head of the wearer is in the form of a torus 30 shown in FIG. 4. This torus 30 may have an inside diameter of $\frac{1}{16}''$, an outside diameter of $\frac{1}{4}''$ and a height of $\frac{1}{16}''$. The ring-like elastomeric member may be formed from a resilient deformable material such as natural rubber or synthetic rubber such as nitrile, Buna compounds, chloroprene, isoprene, butadiene, polybutene, fluorinated or chlorinated elastomers, and plasticized materials such as polyvinyl chloride and polyvinyl choride-polyvinyl acetate copolymers, styrene butadiene materials, and the like, and mixtures thereof having a low Shore-D hardness.

While these particular dimensions are given for one particular embodiment of this invention, other shapes and sizes can be used without departing from the scope of this invention. It is only required that the inside diameter of the elastomeric member be large enought to fit over the hinges of the spectacles and the thickness be such that the elastomeric member will apply pressure between hinge plate 15 and hinge post 20 to provide a biasing force on the temples.

The elastrometric ring-like member 30 can be installed on the spectacles by sliding over the end 21 of temple 13 and then over hinge portion 14. A portion of the elastomeric ring-like member will then extend in space 28 between the hinge 14 and the abutting surfaces of the frame and temple members. A portion of the ring-like member may also extend over the hinge pin 17 to aid in holding this pin in place, preventing it from working loose and being lost.

FIG. 3 shows the elastomeric member 30 in place on a pair of spectacles with the portion 31 in the space 28 between the hinge 14 and the abutting surfaces 18 and 19. Since the major portion 31 of the elastomeric member 30 in space 28 is positioned between the hinge post 20 and hinge plate 15, the greater portion of the biasing force is applied to the metallic surface of the hinge. Thus, when the temple member is moved to its unfolded position, the hinge post 20 will compress the elastomeric material against hinge plate 15 to provide the desired biasing force. This unique positioning of the elastomeric member thus reduces the possibility of distortion which could occur if the entire biasing force were applied primarily to the abutting surfaces of the spectacles in the case of spectacles employing plastic temple and frame members.

The dotted lines 23 show the innermost biased portion of the temple which is available with the elastomeric member in place. The solid lines show the position of the temple as it is intended to be worn. The second set of dotted lines 24 show the outermost position the temple can assume. Thus, with the elastomeric member as shown in FIG. 3, the spectacles can be placed on the head by spreading the temples apart without bending either the frame or the temples due to the resiliency supplied by the elastomeric member and yet the temples will be biased inwardly to hold the spectacles tight against the head of the wearer.

Another embodiment of this invention is shown in FIGS. 6 and 7. The ring-like elastomeric member of this embodiment is in the form of a hollow right cylinder 40 having a narrower ridge member projecting from the outer surface. This cylinder 40 may have an inside diameter of $\frac{1}{16}''$, an outside diameter of $\frac{1}{4}''$ and a height of $\frac{1}{8}''$. The ridge member 42 may have a $\frac{1}{32}''$ by $\frac{1}{32}''$ protrusion on the cylindrical surface 40.

FIG. 5 shows the elastomeric member 40 in place on a pair of spectacles having a large space 28 between hinge 14 and the abutting surfaces 18 and 19. The major portion of the elastomeric member in space 28 is compressed between the hinge post 20 and the hinge plate 15 to provide the greater portion of the biasing force on the temple member. The external narrower ridge portion 42 extends between the abutting surface 18 of the temple member and 19 of the frame member to aid in the biasing of the temple member. Since the volume of resilient material between the abutting surfaces of the frame and temple members is relatively small, the biasing force from portion 42 is not as great as it would be if the entire elastomeric member were placed between the abutting surfaces and consequently the distortion of the frame or temple members which could occur due to the biasing force is considerably reduced. However, the smaller portion of the elastomeric material 42 will aid in biasing the temples inwardly against the head of the wearer.

Thus, it is apparent that temples which have become loose due to warping or loss of resiliency on the temple or frame members can be tightened by the addition of an elastomeric ring-like member positioned over the hinge holding the temple to the frame and extending between the hinge post and hinge plate as well as between the abutting portions of the temple and frame. This ring-like member allows the temples to be flexed outwardly when the spectacles are placed on the head and provides a bias to hold the temples tight against the head when they are worn.

While the forms of apparatus herein described constitute preferred embodiments of the invention, it is to be understood that the invention is not limited to these precise forms of apparatus, and that changes may be made therein without departing from the scope of the invention.

What is claimed is:

1. Apparatus adapted for use in a pair of spectacles which include a frame member, a pair of temple members, and hinge members pivotally connecting each of said temple members to said frame, each said hinge member including a first hinge plate mounted on said frame and a second hinge plate mounted on said temple member, a hinge post having an interlocking portion extending from each of said hinge plates, a hinge pin connecting said corresponding interlocking portions of said hinge posts for pivotal movement, the interlocking hinge posts cooperating with the adjacent temple member, hinge plate, and frame to define a space of preset size when the temple is moved to its extended position, each of said temple members and said frame member having corresponding abutting surfaces which limit the outward travel of said temple members, said apparatus comprising a pair of elastomeric ring-like members each adapted to be placed over one of said hinge members so that a portion of said elastomeric ring-like member is placed between the hinge plate secured to one of said members and the hinge post secured to the other of said members, each of said elastomeric ring-like members being cylindrically shaped and having a cross sectional configuration similar to that of said preset space and sufficient volume to more than fill said preset space so that when the temple member is moved to its extended position, the hinge post will compress said elastomeric member against the hinge plate thereby biasing the temples inwardly against the head of the wearer of said spectacles, and an annular external narrowed ridge portion centrally positioned and extending radially outwardly of the outer surface of said cylindrical shaped ring so that said ridge portion extends between the abutting surfaces of said frame and temple members to further aid in biasing the temple members inwardly against the head of the wearer.

References Cited

UNITED STATES PATENTS

| 2,684,014 | 7/1954 | Fairly | 351—113 |
| 2,761,353 | 9/1956 | Eustis | 351—113 |
| 3,156,757 | 11/1964 | Spina | 351—113 |

DAVID H. RUBIN, *Primary Examiner.*

U.S. Cl. X.R.

351—121